Patented Sept. 17, 1946

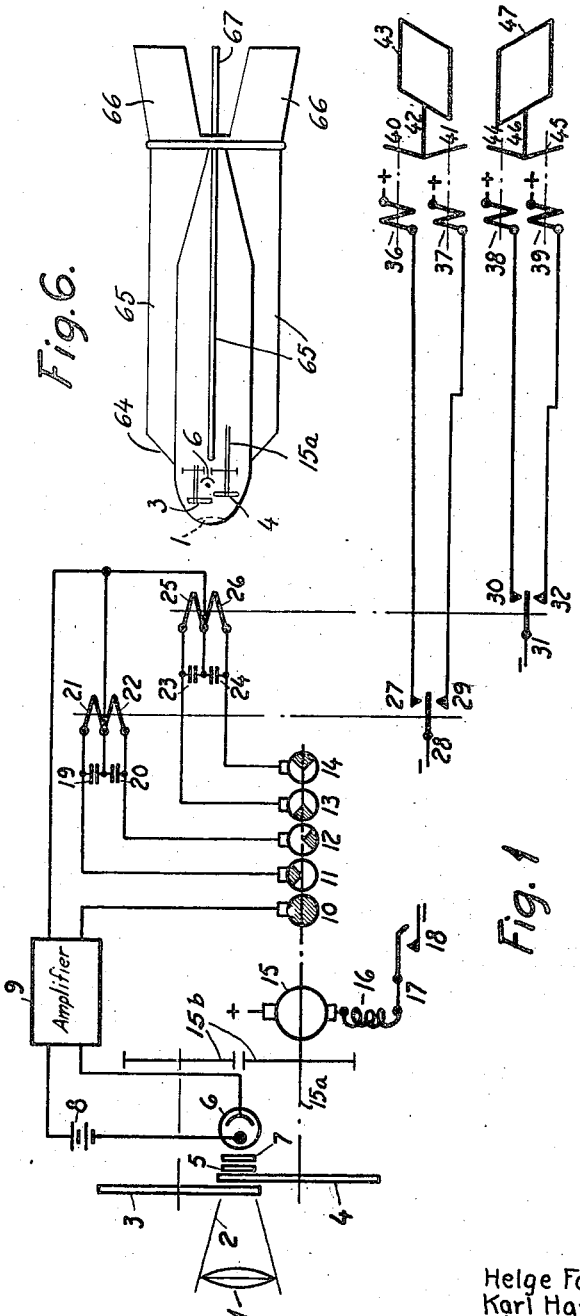

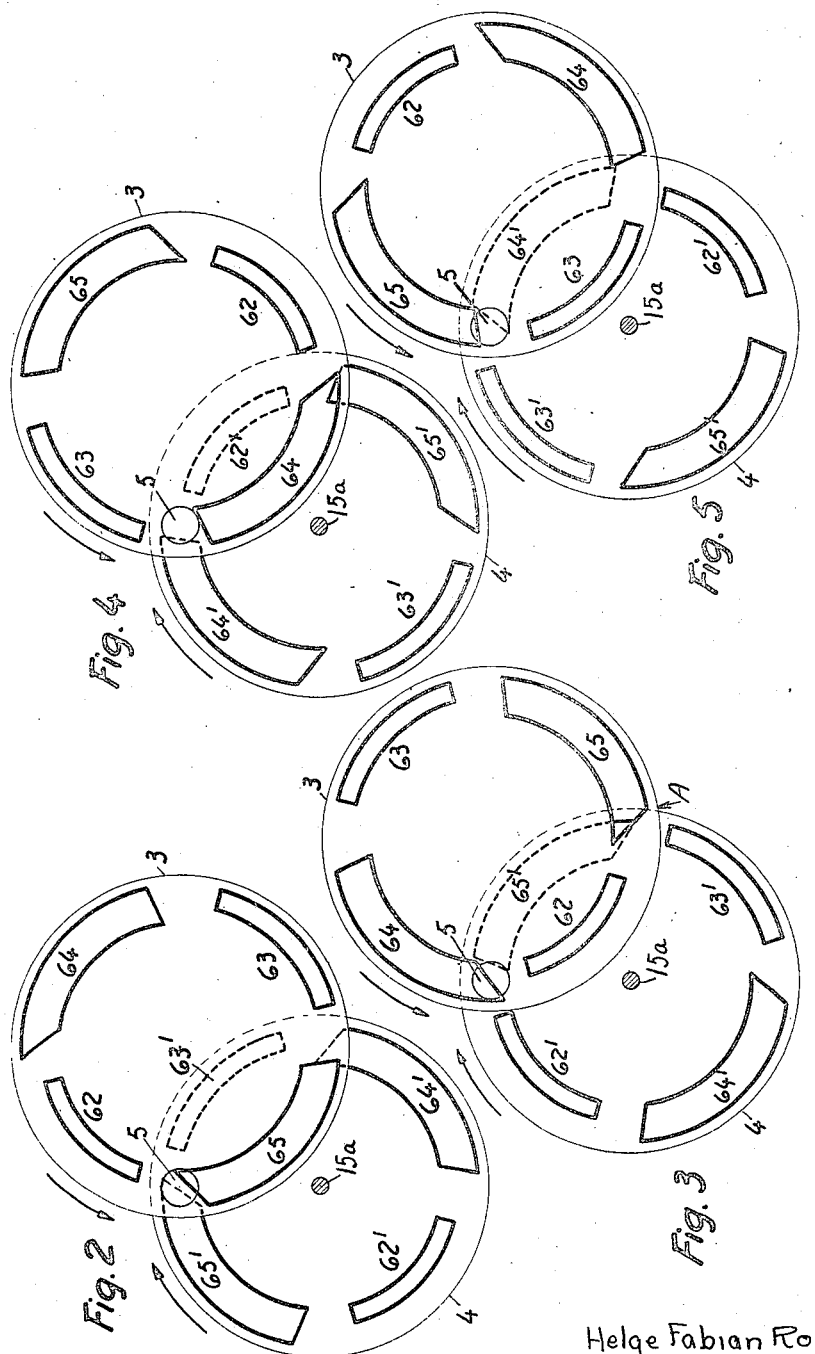

2,407,936

UNITED STATES PATENT OFFICE 2,407,936

AERIAL DROP BOMB

Helge Fabian Rost, Djursholm, Karl Harry Thunell, Nockeby, Sten Daniel Vigren, Stockholm, and Per Harry Elias Claesson, Jakobsberg, Sweden Application December 26, 1941, Serial No. 424,496
In Sweden October 8, 1940

10 Claims. (Cl. 250—2)

The present invention relates to improvements in scanning devices for aerial dropbombs and to the automatic control of the rudders to steer the bomb towards a target.

The present invention and application is a continuation in part of our patent application Ser. No. 348,702, filed July 31, 1940, and refers to particular simplified embodiments of the invention described in the said application.

Instead of two or more scanning tubes shown in the said previous application we according to the present invention use only one single scanning tube, which preferably is provided with a collecting lens. Two rotating screens provided with holes are located between the scanning tube and a single undivided photoelectric cell and adapted to alternatingly expose opposite parts of the total field of scanning and to successively project said parts on the light sensitive total part of the said photoelectric cell or on the sensitive part of any other receiver suitable for the purpose.

The operation of the device will become clear in connection with the accompanying drawings in which:

Fig. 1 is an abbreviated diagram showing a scanning tube with two rotating screens for the seeking and following of a target in one or two planes at right angles to each other.

Figs. 2 to 5 show the positions of the screens with respect to the scanning tube and to the receiving element after turning 0°, 90°, 180° and 270°.

Fig. 6 is an elevational view of an aerial bomb provided with scanning and steering means according to the invention.

In Fig. 1 the focusing lens 1 is placed in the scanning tube 2. Rotating screens or discs 3 and 4 are located in front of an adjustable iris diaphragm 5 adapted to increase or to decrease the field of scanning. 6 is the receiving element, for example, a photoelectric cell. 7 is a filter, for example an infra-red filter, and it can also be an opaque screen or ray distributing device to spread the received rays over the whole receiving element. 8 is a battery connected in series with the photocell. 9 is an amplifier. 10—14 are contact discs attached to a rotary shaft 15a driven by motor 15 with field coil 16. The rotating screen 4 is mounted directly on the shaft 15a and the screen 3 is driven from said shaft at the same speed as the screen 4 but in the opposite direction by means of a gearing 15b. The scanning screens 3, 4 in Fig. 1 are viewed in the direction of the arrow A in Fig. 3. 17—18 is a contact device adapted to be closed at the dropping of the bomb or a certain time thereafter. 19 and 20 are condensers connected in parallel to the windings 21 and 22 of a polarized relay provided with contacts 27—28—29. 23 and 24 are condensers connected in parallel with windings 25 and 26 of another polarized relay provided with contacts 30—31—32. The contacts 27 and 29 are connected, respectively, to the steering magnets 36 and 37 which control, for example, a rudder 43 adapted to cause deviation of the bomb from its axial course in one direction, while contacts 30 and 32 are connected, respectively, to the steering magnets 38, 39 for a second rudder 47 adapted to cause deviations of the bomb from its course in a second direction at right angles to said first direction. The electromagnets 36 and 37 are provided with a common armature having arms 40 and 41 directly attached to the rudder 43 by means of the bar 42. The rudder 47 is attached to armature arms 44 and 45 by means of bar 46 which can be actuated by electromagnets 38 or 39 respectively.

The device operates in a way similar to that described in the above mentioned copending application but with the difference that a single scanning tube combined with two rotating screens or discs provided with slits is used, the operation of which will be further described in connection with Figures 2-5. By means of said screens amounts of energy corresponding, for example, to half of the total field of scanning can successively be allowed to pass through the iris diaphragm 5 to the photocell 6 shown, which cell for each exposure receives the total radiant energy from the corresponding half of the field of scanning. The current generated in the photocell for each exposure is amplified in the amplifier 9 and is thereafter conducted through one of the rotating contact discs 11—14, one of the condensers 19, 20 or 23, 24.

As will be seen from the drawings, the potential of the circuit containing the element 6, battery 8 and amplifier 9 is applied during the first 90° of each revolution of shaft 15a through contact disc 11 to condenser 19, during the second 90° of each revolution through contact disc 13 to condenser 23, during the third 90° of each revolution through disc 12 to condenser 20, and during the last 90° through disc 14 to condenser 24.

In Figs. 2 to 5 is shown in detail how an amount of radiant energy corresponding to half of the field of scanning is allowed to successively pass the screens to the photocell. The screens 3 and 4 rotate in opposite directions. The iris diaphragm 5 is provided with a hole or opening that would permit passage of a picture of the whole field of scanning, if the screens were not arranged according to the present invention. In the disc 3 there are provided concentric slits 62 and 63, of which upon rotation of the discs in the direction of the arrows, the slit 62, during the first 90° of each revolution of shaft 15a, passes radiant wave energy only from the right vertical half of the field of scanning (see Fig. 2), while the slit 63, during the third 90° of each revolution of shaft 15a, passes radiant energy only from the left vertical half of the same field of scanning as shown in Fig. 4. In the disc 4 the corresponding slits are indicated 62' and 63' and have such a width and location with respect to the opening of the iris diaphragm 5 that the slit 62', during the second 90° of each revolution of shaft 15a, passes radiant energy only from the lower horizontal half of the field of scanning (see Fig. 3), while the slit 63', during the last 90° of each revolution of the shaft 15a, passes radiant energy only from the upper horizontal half of the field of scanning (see Fig. 5).

As the discs 3 and 4 overlap each other, each disc is provided with broader slits located at 90° with respect to the corresponding slits of exposure in order to successively allow radiant energy to pass from the respective halves of the field of scanning through the slits of the other disc. The disc 3 is thus provided with the broad openings 64 and 65 and the disc 4 is provided with corresponding broad openings 64' and 65'.

When, for example, in Fig. 2 the slit 62 of the disc 3 opens half the iris diaphragm 5, the broad opening 65' of disc 4 has already started to open. In such a way the broad openings of each disc, 4, 3, successively open the way for radiant energy through the respective narrow slits of the opposite disc, 3, 4. Thus, during each quarter revolution of the shaft 15a, the potential in the circuit of the amplifier 9 is modified in dependence upon the wave energy received from a predetermined half of the field of scanning only and this modified potential is applied to the corresponding one of the condensers 19, 20, 23, or 24 which is connected into the amplifier circuit during this particular quarter revolution of shaft 15a by means of the associated contact discs 11 to 14, so that each condenser, in the course of a complete revolution of the shaft 15a, is charged with a potential which is a function of the wave energy received during this revolution from a predetermined half of the field of scanning.

If the wave energy received from each half of the scanning field is equal, both pairs of condensers are equally charged and, subsequently may discharge through the counteracting windings 21—22 and 25—26 of the corresponding polarized relays without changing the neutral positions of the rudders 43 and 47.

Should, however, greater energy be received from one half of the scanning field than from the opposite half thereof, the condensers 19 and 20, for example, will receive different charges. Then, upon discharge of the condensers, a greater current is passed through one of the windings 21 or 22, and the armature 28 is thereby operated in one or the other direction to transmit current impulses which operate the corresponding rudder 43. Thus, the direction of the bomb is changed until finally equal amounts of energy are received from each half of the scanning field indicating that the direction of the bomb is straight on the selected target.

By means of the described device, radiant energies from two opposite halves of the field of scanning are first compared with each other, whereafter energies from two other opposite half parts of the field of scanning, preferably located at an angle of 90°, also are compared with each other, the differentials are applied to the rudders.

Fig. 6 illustrates the application of a scanning and steering device according to the invention to an aerial bomb 64 provided with steering fins 65 and with rudders 66, 67, corresponding, respectively, to the steering surfaces 43 and 47 of Fig. 1. The lens 1, scanning discs 3, 4, drive shaft 15a and the photoelectric cell 6 are indicated in dotted lines at the front end of the bomb 64.

What we claim is:

1. A dropbomb as claimed in claim 4, in which each screen in addition to the said two concentric slits is provided with two more concentric oppositely disposed openings, each of said openings being offset 90° with respect to each of said slits, each of said openings being at least double the size of each of said slits and located at such a distance from the center of the screen that the wave energy from the whole scanning field can pass through said openings.

2. A dropbomb as claimed in claim 4, in which each screen in addition to the said two concentric slits is provided with two concentric oppositely disposed openings, each of said opening being offset 90° with respect to the said slits, each of the openings being at least double the width of each slit and located at such a distance from the center of the screen that the wave energy from the whole field can pass through said openings, the two screens with their slits and openings being located with respect to the respective centers of rotation at such distances and with respect to the said scanning tube and the said single receiving element so that the concentric slits of one screen allow, for example, the northern and southern half-parts of the field of scanning to alternatingly pass to the receiving element, while the concentric slits of the other screen allow the eastern and western half-parts of the same field of scanning to alternatingly pass to the same receiving element.

3. The dropbomb as claimed in claim 4, in which said actuating means rotate said screens in opposite directions, each screen in addition to said two concentric slits being provided with two concentric oppositely disposed openings, each of said openings being offset 90° with respect to the said slits, each of said openings being of at least double the width of each slit and located at such a distance from the center of the respective screen that the wave energy from the whole scanning field can pass through said openings, the slits and openings of one screen being retarded 90° with respect to the corresponding slits and openings of the other screen, and the wide openings of one screen being adapted to freely allow the wave energy to alternatively pass from the two opposite parts of the field of scanning through the slits of the other screen.

4. The combination with a self-steering dropbomb comprising at least two planes and at least two rudders arranged at an angle to one another, receiving means for reception of radiant wave energy reflected from a target and its surrounding medium, amplifying means and means for the transfer of rectified energy to the respective rudders for the operation of same, said receiving means including an electric circuit and a single wave energy responsive element in said circuit adapted to produce electric potential variations depending upon the wave energy received by said element, of a scanning device adapted to successively locate a target in equal opposite parts of a field of scanning, said scanning device consisting of a single scanning tube and of two rotatable screens located between said receiving element and said scanning tube, and actuating means for rapidly rotating said screens, each screen comprising two concentric diametrically opposed arcuate slits so located with respect to the said receiving element and to the said scanning tube as to alternatingly allow wave energy from one part of the field of scanning to pass through one of said concentric slits to the said receiving element and after rotation of 180° of each screen to allow wave energy from an opposite equal part of the field of scanning to pass through the second concentric slit to said receiving element to cause potential variations in same, and control means responsive to voltage changes in said circuit, said control means being operatively connected to said rudders, whereby the respective rudders are actuated by said potential variations to steer the dropbomb toward the target in accordance with the variations of the wave energy received from said opposite equal parts of the scanning field.

5. The combination with steering means responsive to electrical impulses to cause deviations of an object moving in space from a predetermined axis in two directions at right angles to each other and to said axis, of a single wave energy responsive element centered on said axis, a scanning device including wave energy collecting means to converge wave energy emitted from a scanning field upon said responsive element, two rotatable screens having overlapping parts disposed in front of said responsive element, means for rotating said screens, each screen being provided with two concentric scanning slots displaced a certain angle relative to each other and being so disposed with respect to said responsive element and said collecting means as to pass, in one angular position of said screens, wave energy from an area on one side of a center plane of the scanning field through one of said concentric slots to said responsive element, and, after each screen has rotated through said certain angle, to pass wave energy from an equal area on the other side of said center plane of the scanning field through the other concentric slot to said responsive element to generate electrical potentials therein, distributing means electrically connected to the responsive element and to the steering means to apply to the latter for steering purposes the positive or negative differentials between two potentials obtained from opposite halves of the scanning field, and means for operating said distributing means synchronously with said rotating screens.

6. A combination, as claimed in claim 5, in which the two scanning slots of each screen are disposed in diametrically opposite quarter segments thereof and each screen is further provided with two diametrically opposed openings in the two remaining quarter segments of the screen, said openings having at least double the width of each slot and being located at such a distance from the center of the screen that the wave energy from the whole scanning field could pass through each opening.

7. A combination, as claimed in claim 5, including a wave distributing device located between the rotatable screens and the responsive element to distribute the amounts of wave energy received from the successively exposed parts of the scanning field over the whole surface of the responsive element.

8. In an automatic steering apparatus for a missile having a tendency to move in space along a course coinciding generally with a predetermined axis of the missile, the combination with rudder means adjustable to cause deviations to said missile from said course in two directions at right angle to each other and to said axis and an electric control mechanism for said rudder means, of a target scanning device including an electric circuit, a single wave energy responsive element facing in the direction of movement of said missile and being centered on said axis, said element being inserted in said circuit to modify its potential in function of the wave energy received, two screens rotatable about axes parallel to each other and to said predetermined axis and having overlapping peripheral portions disposed in front of said element, said screen being provided with cooperating apertures to pass wave energy to said element in a predetermined succession from the two halves of the scanning field disposed on opposite sides of a first plane containing said predetermined axis and from the two halves of said scanning field disposed on opposite sides of a second plane containing said axis and intersecting said first plane at right angles, four storage devices for storing electrical potentials, a distributor adapted to connect said storage devices in a predetermined succession into said electrical circuit, means for synchronously driving said screens and distributor to apply to each storage device a potential in function of the wave energy received from one certain half of the scanning field, and means for operating said electrical control mechanism by means of the differentials between the potentials stored in each pair of storage devices corresponding to two opposite halves of the scanning field so as to cause an adjustment of said rudder means.

9. An automatic steering apparatus, as claimed in claim 8, in which the axes of said wave responsive element and of said rotatable screens define between them an imaginary triangular isosceles prism forming an angle of 90° at its edge defined by the axis of said element.

10. An automatic steering apparatus, as claimed in claim 8, in which the axes of said wave responsive element and of said rotatable screens define between them an imaginary triangular isosceles prism forming an angle of 90° at its edge defined by the axis of said element and two scanning slots are provided in two different quarter segments of each screen, the two scanning slots of each screen being radially offset with respect to each other so as to pass in front of said element on opposite sides of the latter's axis, and two openings provided in the remaining two quarter sections of each screen, respectively, to completely uncover said element whenever one of the scanning slots of the other screen passes in front of said element.

HELGE FABIAN ROST.
KARL HARRY THUNELL.
STEN DANIEL VIGREN.
PER HARRY ELIAS CLAESSON.